(12) United States Patent
Nakajima

(10) Patent No.: US 11,729,348 B2
(45) Date of Patent: Aug. 15, 2023

(54) IMAGE PROCESSING APPARATUS ALLOWING DISPLAY CONTROL OF DE-SQUEEZED IMAGE, AND CONTROL METHOD OF IMAGE PROCESSING APPARATUS

(71) Applicant: CANON KABUSHIKI KAISHA, Tokyo (JP)

(72) Inventor: Michinori Nakajima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 17/152,172

(22) Filed: Jan. 19, 2021

(65) Prior Publication Data
US 2021/0235039 A1    Jul. 29, 2021

(30) Foreign Application Priority Data

Jan. 23, 2020    (JP) .................................. 2020-009115

(51) Int. Cl.
| | |
|---|---|
| H04N 7/01 | (2006.01) |
| G06T 5/00 | (2006.01) |
| H04N 5/91 | (2006.01) |
| G06T 3/40 | (2006.01) |

(52) U.S. Cl.
CPC ............. *H04N 7/0122* (2013.01); *G06T 3/40* (2013.01); *G06T 5/006* (2013.01); *H04N 5/91* (2013.01)

(58) Field of Classification Search
None
See application file for complete search history.

(56) References Cited

U.S. PATENT DOCUMENTS

| | | | |
|---|---|---|---|
| 2005/0200744 A1* | 9/2005 | Kobayashi | H04N 5/2352 348/362 |
| 2016/0142641 A1* | 5/2016 | Wakamiya | H04N 5/23296 348/333.12 |
| 2018/0063445 A1* | 3/2018 | Ogaki | H04N 5/2628 |
| 2018/0338091 A1* | 11/2018 | Akimoto | H04N 5/23296 |

FOREIGN PATENT DOCUMENTS

JP    2018037859 A    3/2018

\* cited by examiner

*Primary Examiner* — Quan Pham
(74) *Attorney, Agent, or Firm* — Canon U.S.A., Inc. IP Division

(57) ABSTRACT

An image processing apparatus includes: an acquisition unit configured to acquire a captured image of 1 frame as an Nth frame image; and a control unit configured to (1) record the Nth frame image in a memory, (2) enlarge an region having a predetermined aspect ratio in a horizontal direction wherein the region is a part of an image of a frame prior to the Nth frame recorded in the memory, and (3) display the enlarged region, within a period in which the Nth frame image is acquired and recorded.

17 Claims, 6 Drawing Sheets

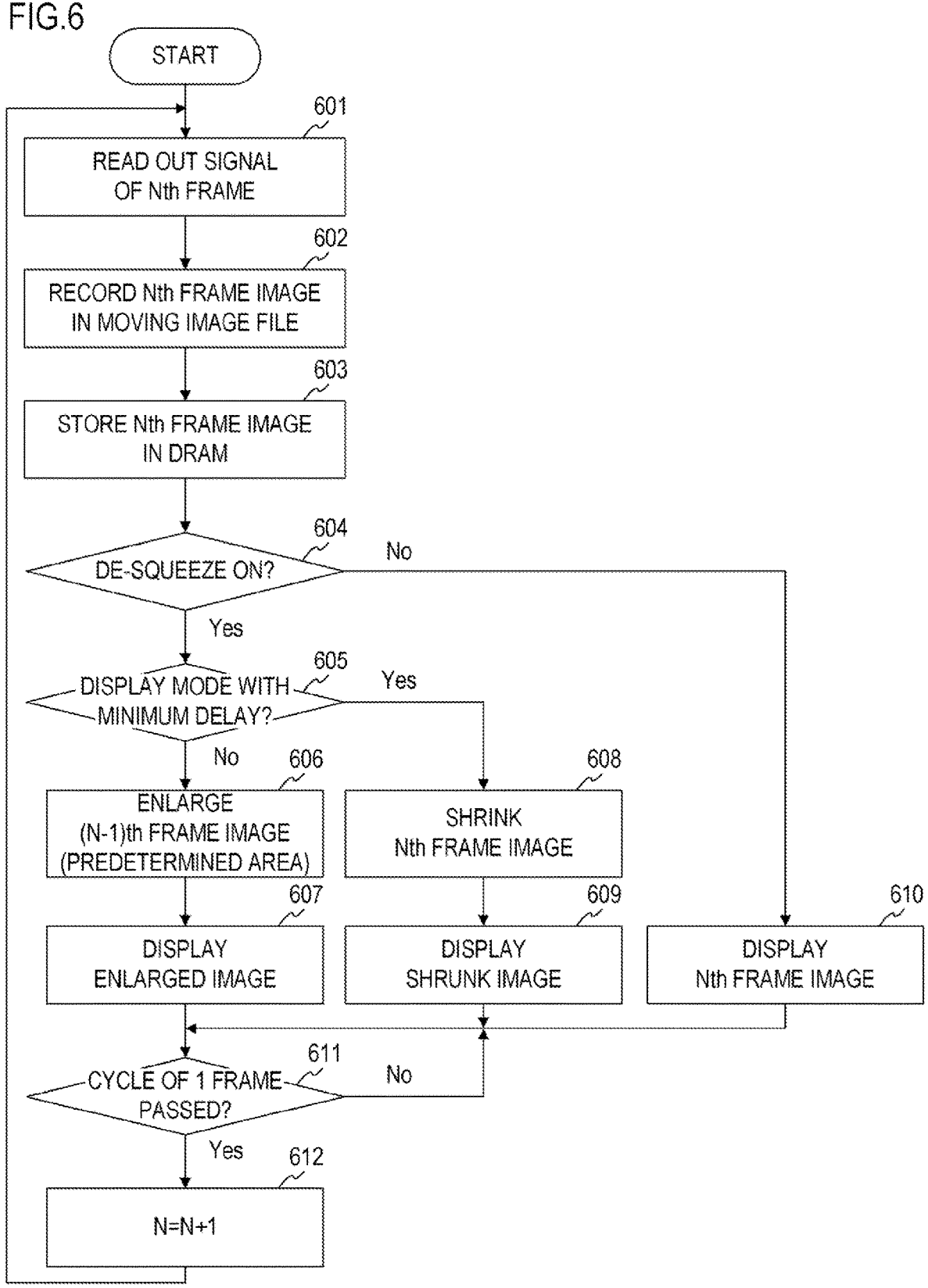

IMAGE PROCESSING APPARATUS ALLOWING DISPLAY CONTROL OF DE-SQUEEZED IMAGE, AND CONTROL METHOD OF IMAGE PROCESSING APPARATUS

BACKGROUND

Field of the Disclosure

The aspect of the embodiments relates to an image processing apparatus and a control method of the image processing apparatus, and more particularly to a technique for displaying a de-squeezed image.

Description of the Related Art

In recent years, cameras for professional use include a camera equipped with a function of electronically reversing the horizontal compression of (de-squeezing) an image captured by an anamorphic lens. The anamorphic lens is a special lens that forms a horizontally compressed optical image of an object when capturing the object image. By capturing an image formed by the anamorphic lens and de-squeezing the image during, for instance, a post process, it is possible to obtain a horizontally long image (e.g., CinemaScope (registered trademark) image with an aspect ratio of 2.39:1).

The anamorphic lens, due to intrinsic characteristics thereof, causes distortion at left and right ends of a captured image before de-squeezing. To deal with this, a technique is known in which a part of the horizontally compressed image is cut out and horizontally stretched, then output to a display medium as a de-squeezed image, with sides thereof having been cut off (Japanese Patent Application Laid-open No. 2018-037859). However, since an amount of distortion caused by the anamorphic lens differs largely between the center and vicinities of left- and right-ends of the image, the object cannot be represented correctly at the left and right ends by simple horizontal stretching. Hence, in Japanese Patent Application Laid-open No. 2018-037859, side parts are cut off and the central part of the image, where the image is less affected by the distortion when stretched, is cut out.

Since the de-squeezed image is generated using part of an input image data as described above, the time available for the generation of the de-squeezed image is reduced in accordance with the cut-out area. For example, when cutting out one half of the entire region of the input image data to perform the de-squeeze process of stretching the region two times horizontally, the de-squeezed image is to be generated in half the time required for inputting an image of 1 frame. When the time usable for the de-squeeze process is too short due to a high frame rate or other factors, there is a risk that generation of a de-squeezed image cannot be completed within half the time for required inputting an image of 1 frame. In this case, an issue arises in which the de-squeezing function cannot be implemented in image-capturing with the use of an anamorphic lens.

SUMMARY

The aspect of the embodiments provides
an image processing apparatus, comprising:
an acquisition unit configured to acquire a captured image of 1 frame as an Nth image; and
a control unit configured to (1) record the Nth frame image in a memory, (2) enlarge an region having a predetermined aspect ratio in a horizontal direction wherein the region is a part of an image of a frame prior to the Nth frame recorded in the memory, and (3) display the enlarged region, within a period in which the Nth frame image is acquired and recorded.

Further features of the disclosure will become apparent from the following description of exemplary embodiments with reference to the attached drawings.

BRIEF DESCRIPTION OF THE DRAWINGS

FIG. 6 is a flowchart illustrating examples of de-squeeze processes according to the embodiment.

DESCRIPTION OF THE EMBODIMENTS

An exemplary embodiment of the disclosure will be described in detail below with reference to the accompanying drawings. It is to be noted that the following exemplary embodiment is merely one example for implementing the disclosure and can be appropriately modified or changed depending on individual constructions and various conditions of apparatuses to which the disclosure is applied. Thus, the disclosure is in no way limited to the following exemplary embodiment.

Embodiments

<Configuration Diagram of Imaging Apparatus 100>

Figure 1:
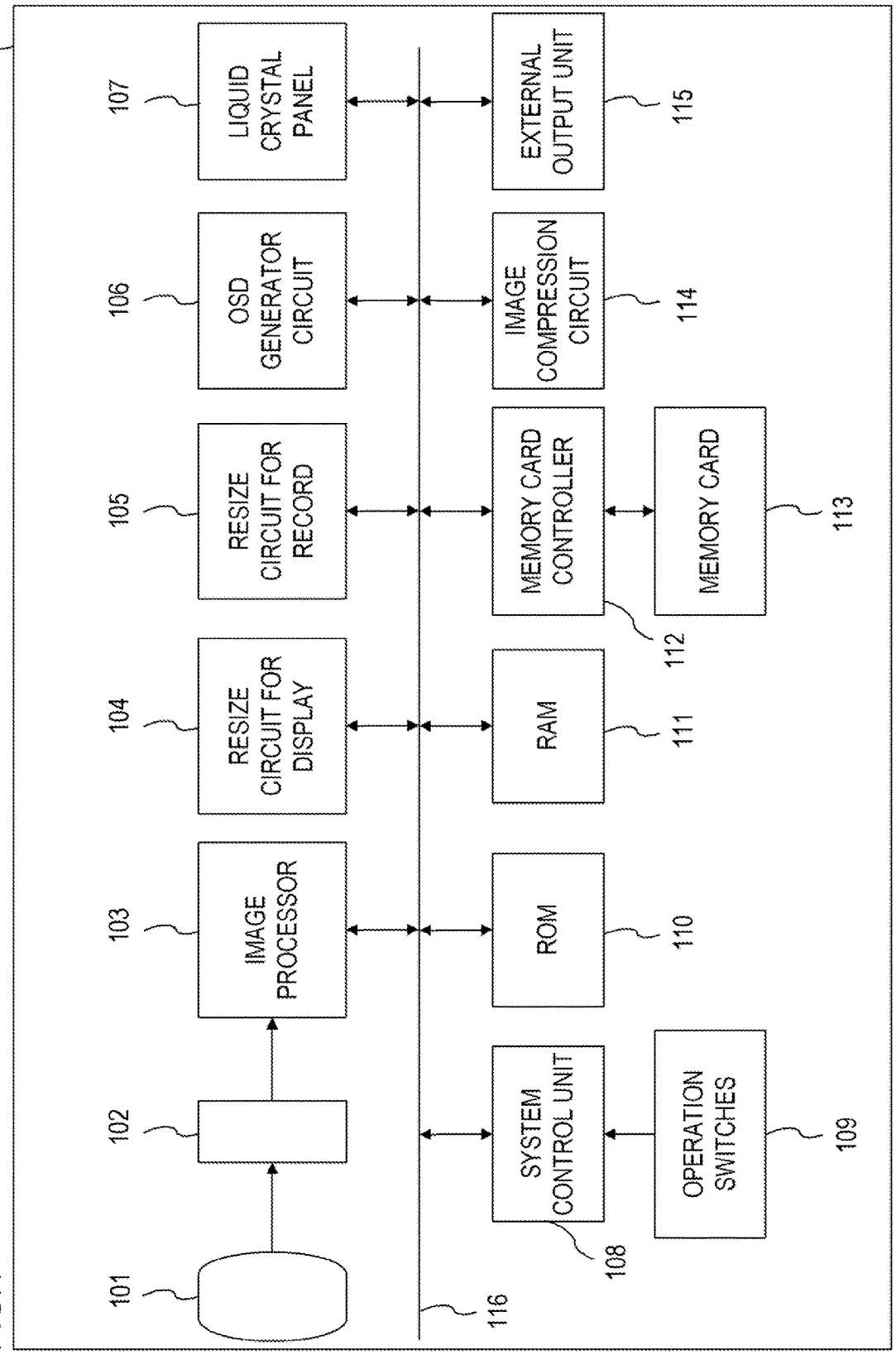
FIG. 1 is a configuration diagram of an imaging apparatus according to the embodiment.

FIG. 1 is a configuration diagram of an imaging apparatus 100 (image processing apparatus) according to the embodiment.

Lens unit 101 is an optical system made up of fixed lenses for collecting light, zoom lenses, an aperture, correction lenses (lenses having both functions of correcting the image-forming position that has moved with a movement of the zoom lenses, and of adjusting the focal point), and so on. The lens unit 101 forms an image of an object on an image-forming plane of an image sensor 102 to be described later.

The image sensor 102 is an imager that converts light into electrical charges to generate an image signal, and may be a CCD image sensor or a CMOS image sensor, for example. The generated image signal is output to an image processor 103. The imager may be of a dual pixel type in which all the pixels on the image-forming plane are each formed by a pair of photoreceptors, these pairs of photoreceptors being capable of photoelectric conversion of pairs of optical images formed by micro lenses in respective pixels.

The image processor 103 converts the image signal output by the image sensor 102 into RAW data (RAW image). The image processor 103 performs RAW development processing such as interpolation, image quality adjustment, etc., to the converted RAW data and generates YUV format image data corresponding to the RAW data. The image processor 103 outputs the generated YUV format image data to a resizer circuit for display 104 and a resizer circuit for record 105. The image processor 103 stores the generated YUV format image data in the RAM 111 as image data for noise reduction (image data for recursive NR). Here, the "image data for noise reduction" is image data to be used by the image processor 103 for the noise reduction process of the next frame.

The resizer circuit for display 104 performs resizing and de-squeezing to be described later to the YUV format image data output from the image processor 103 to generate image data to be displayed. The resizer circuit for display 104 stores the generated image data to be displayed in the RAM 111.

The resizer circuit for record 105 performs resizing to the YUV format image data output from the image processor 103 to generate image data to be recorded. The resizer circuit for record 105 stores the generated image data to be recorded in the RAM 111.

OSD generator circuit 106 is a circuit that generates an on-screen display (OSD). Specifically, the OSD generator circuit 106 generates OSD data such as various settings menus, titles, time, and so on. The OSD generator circuit 106 stores the generated OSD data in the RAM 111. The OSD data is combined with the image data to be displayed stored in the RAM 111, and is displayed on a liquid crystal panel 107 that is a display unit, or is output to an external device via an external output unit 115 to be described later.

The liquid crystal panel 107 is a display unit for showing the image data to be displayed or OSD. The display unit is not limited to the liquid crystal panel and may be of other types such as an organic EL panel.

System controller 108 is a controller, for example, a microcomputer, which controls the entire imaging apparatus 100. The system controller 108 can also be understood as a display controller that controls the display of images on the imaging apparatus 100 or an external device.

Operation switches 109 are switches that receive operations by the user. The operation switches 109 include a switch for selecting one of a camera mode that allows camera image-capturing, a play mode for playback of images, and a power OFF mode for turning off the power.

ROM 110 is a flash ROM, where programs and the like executed by the system controller 108 are stored. Some areas of the ROM 110 are used for retaining a state or the like of the system as a back-up.

RAM 111 is a volatile memory used by the system controller 108, image processor 103, an image compression circuit 114 and others as a work memory.

A memory card controller 112 records moving image data and the like in accordance with a format compatible with a computer such as a FAT file system in a memory card 113. The memory card 113 is a detachable recording medium of the imaging apparatus 100 and can be mounted to other devices than the imaging apparatus 100 such as a PC.

The image compression circuit 114 encodes the image data stored in the RAM 111 (e.g., MPEG compression) to generate moving image data or the like and outputs the same to the RAM 111.

The external output unit 115 is an interface for allowing output of the image data to be displayed to an external device (output unit of HDMI (registered trademark), SDI and the like). The external output unit 115 allows output of signals (image data to be displayed) at 4K60P, 2K60P or other specifications.

Bus 116 is a bus for sending and receiving data among various units of the imaging apparatus 100.

<Image Data Generation Process (First De-Squeeze Process)>

Figure 2:
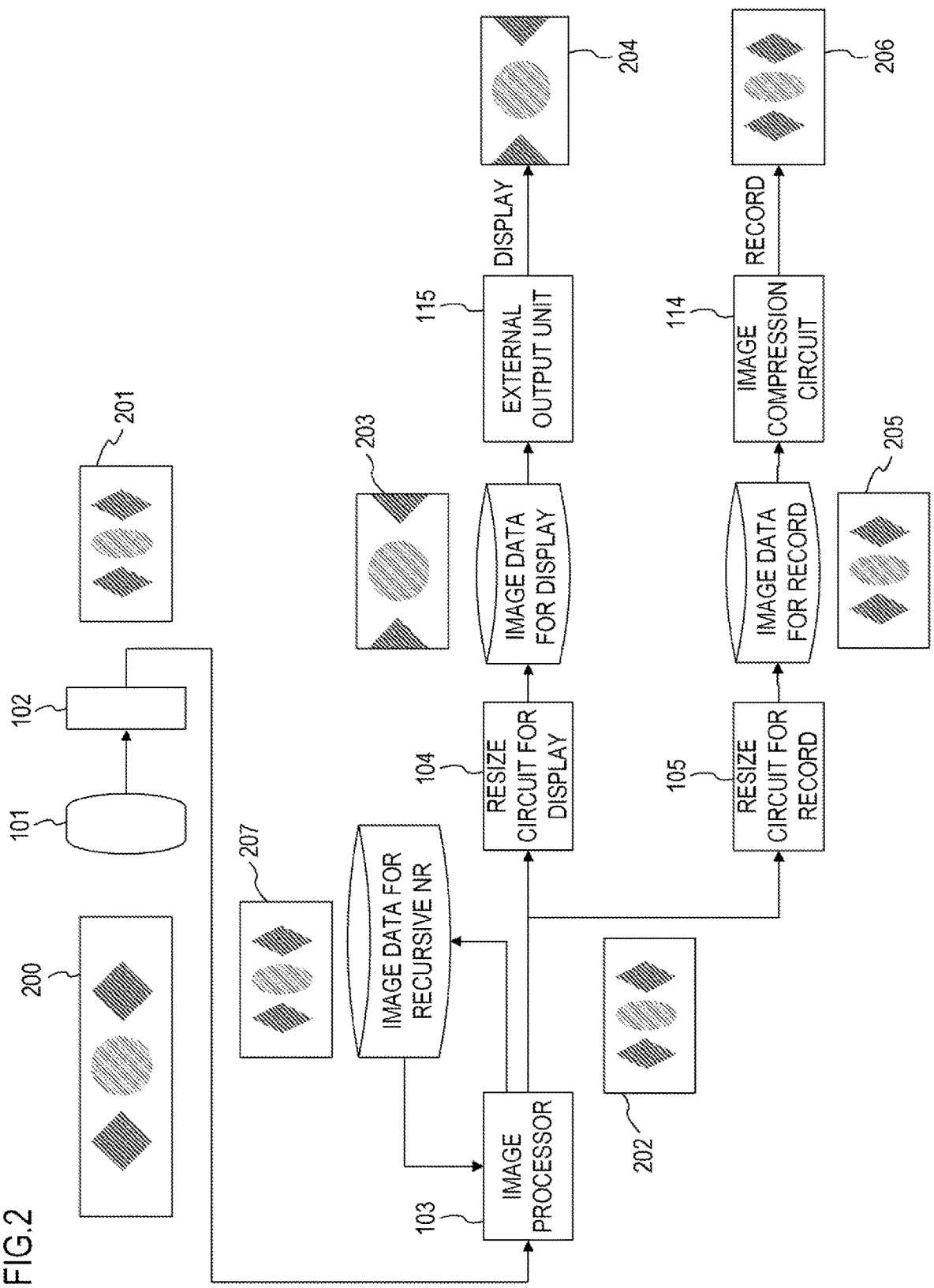
FIG. 2 is a diagram illustrating an example of a process of generating image data according to the embodiment.

FIG. 2 is a diagram illustrating an example of a process of generating image data in the imaging apparatus 100. Here, the lens unit 101 is an anamorphic lens having a vertical/horizontal compression ratio of 1:2.

An image captured by the anamorphic lens is a distorted image, having been squeezed (shrunk) by 1/1.33 or ½ laterally (horizontally) in accordance with the squeeze ratio (at which the image is to be shrunk) of the lens being used. Such optical compression enables capturing of an image of an angle of view that is horizontally wider than that of an image the sensor is able to capture. A CinemaScope image can be obtained by de-squeezing (stretching) the image captured by the anamorphic lens by 1.33 times or two times horizontally (de-squeeze ratio) in accordance with the squeeze ratio of the anamorphic lens that was used.

Object image 200 is an image of the object captured by the imaging apparatus 100. The image sensor 102 forms an image of the object 200 in a state compressed by the lens unit 101 with the vertical/horizontal compression ratio of 1:2, and converts the light into an electrical signal (image signal 201). The image signal 201 converted from light undergoes various image processing by the image processor 103 and is stored in the resizer circuit for display 104 and resizer circuit for record 105 as YUV format image data (image data 202). This image data is stored in the RAM 111 as image data for noise reduction (image data for recursive NR; image data 207). As mentioned above, the "image data for noise reduction" is image data to be used by the image processor 103 for the noise reduction process of the next frame.

The YUV format image data output by the image processor 103 undergoes the first de-squeeze process to be described later by the resizer circuit for display 104, and is stored in the RAM 111 as image data to be displayed (image data 203). The stored image data to be displayed is output externally (to an external device) via the external output unit 115 (image data 204). Alternatively, the image data to be displayed may be output to the liquid crystal panel 107. In this embodiment, the de-squeezing feature can be turned on or off by a user operation for each output destination.

The YUV format image data output by the image processor 103 is resized to a size for record by the resizer circuit for record 105, and stored in the RAM 111 as image data to be recorded (image data 205). The stored image data to be recorded is compressed by the image compression circuit 114, and recorded in the memory card 113 (image data 206) via the memory card controller 112.

<First De-Squeeze Process>

Figure 3:
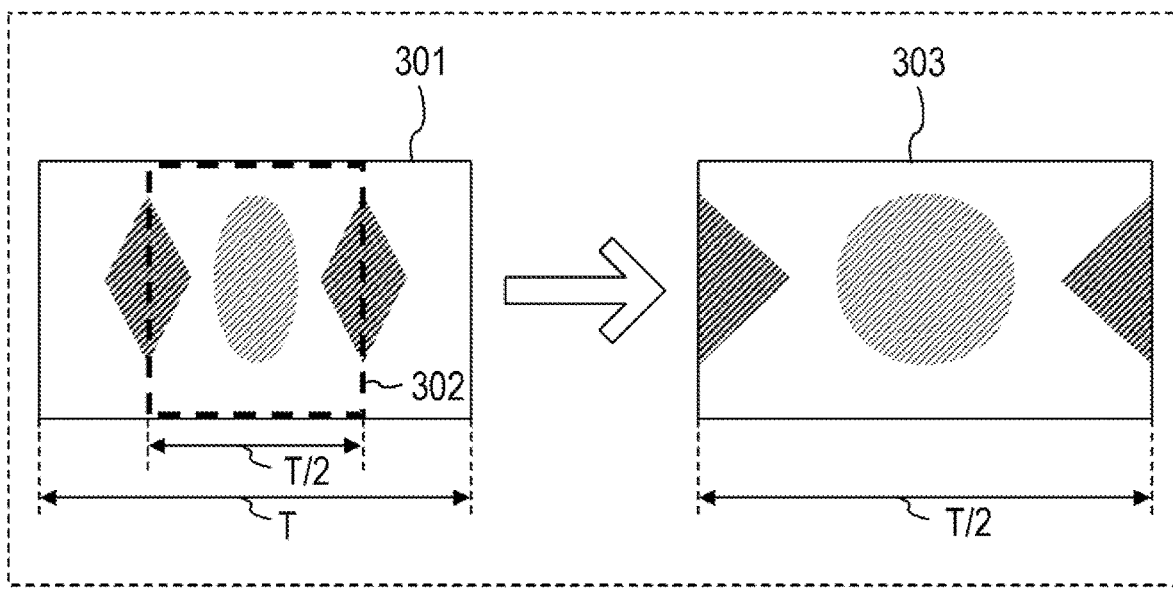
FIG. 3 is a diagram illustrating an example of a de-squeeze process according to the embodiment.

FIG. 3 is a diagram illustrating an example of the first de-squeeze process according to the embodiment. Image data 301 represents the YUV format image data input to the resizer circuit for display 104. The resizer circuit for display 104 stretches a region ¼ to ¾ from the left edge of the image data 301 (region 302) two times horizontally to generate image data to be displayed (image data 303). Namely, the resizer circuit for display 104 produces an image with a vertical/horizontal compression ratio of 1:1 from the image compressed by the lens unit 101 by the de-squeeze process. The de-squeeze process can also be understood as a process of changing the aspect ratio of an image.

In the first de-squeeze process, the resizer circuit for display 104 uses a half of the region (region 302) of the YUV format image data (image data 301) to generate the image data to be displayed (image data 303). The YUV format image data is scanned horizontally, and each scanned line is input to the resizer circuit for display 104. The image data to be displayed for 1 line has to be generated in time T/2, where T is the input time for 1 line.

However, it is possible that if the time available for the resizing (time T/2) is too short, generation of the image data to be displayed may not be completed in time due to performance limitations of the resizer circuit for display 104. For example, when the frame rate is 60 [fps], time T is 1/60 [s], and time T/2 is 1/120 [s]. When the frame rate is 120 [fps], time T is 1/120 [s], and time T/2 is 1/240 [s]. The higher the frame rate is, the shorter the time available for the resizing, and more likely that the first de-squeeze process described above may not be completed in time.

In this embodiment, one example will be described in which a second de-squeeze process or a third de-squeeze process is performed instead of the first de-squeeze process.

<Image Data Generation Process (Second and Third De-Squeeze Processes)>

Figure 4:
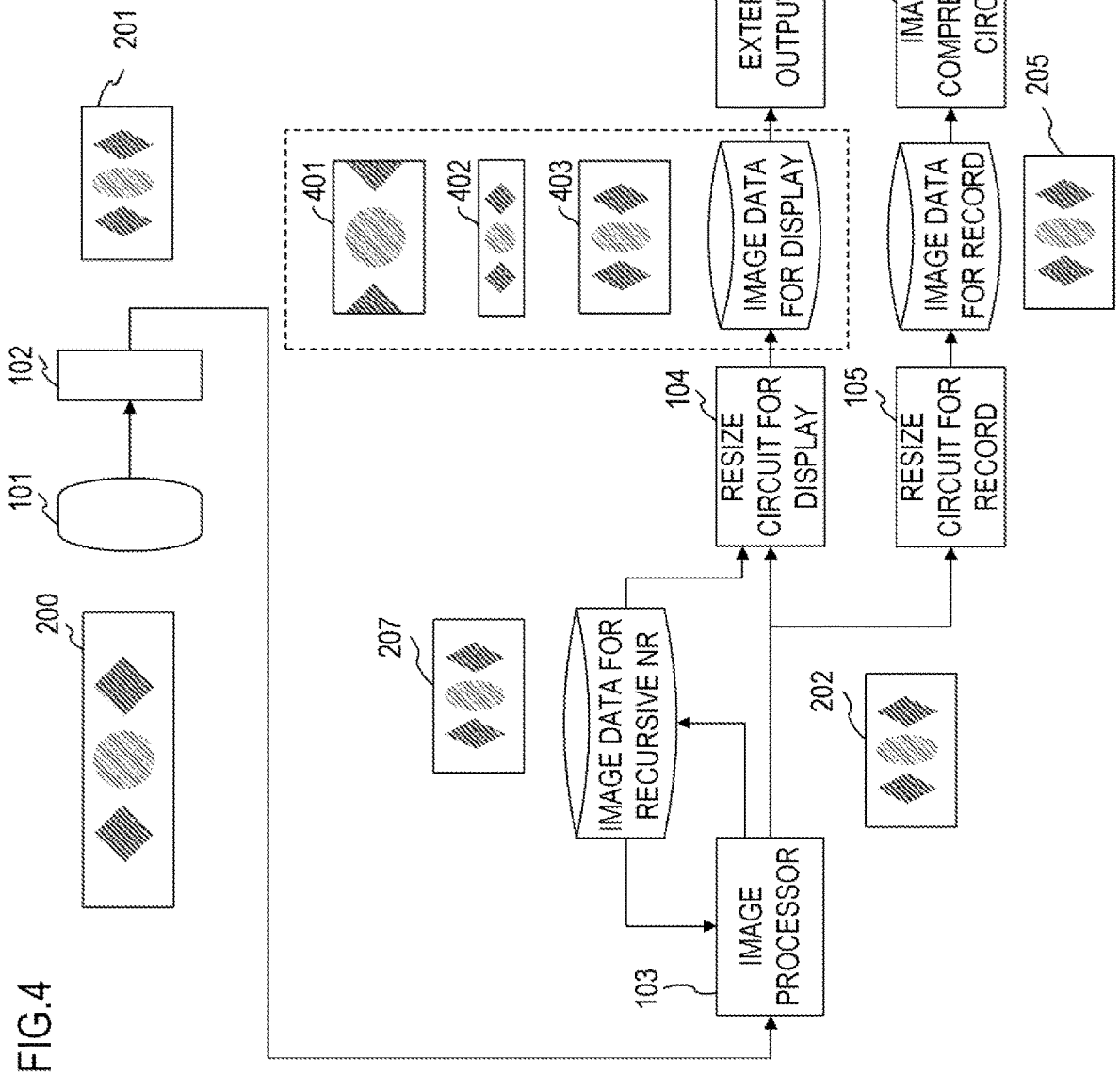
FIG. 4 is a diagram illustrating an example of a process of generating image data according to the embodiment.

FIG. 4 is a diagram illustrating an example of a process of generating image data in the imaging apparatus 100. Here, the lens unit 101 is an anamorphic lens having a vertical/horizontal compression ratio of 1:2. In FIG. 4, same numerals are given to units that perform the same processing as that of FIG. 2 to omit repetitive description.

In this embodiment, when performing the second de-squeeze process, the resizer circuit for display 104 uses image data of 1 frame before acquired from the RAM 111. Specifically, the resizer circuit for display 104 reads out a region to be used for display of the image data for recursive NR (image data 207) of 1 frame before that is acquired from the RAM 111, and de-squeezes the region to generate the image data to be displayed (image data 401). The resizer circuit for display 104 stores the generated image data to be displayed in the RAM 111. The stored image data to be displayed is output externally (to an external device) via the external output unit 115 (image data 411). Alternatively, the image data to be displayed may be output to the liquid crystal panel 107.

In this embodiment, when performing the third de-squeeze process, the resizer circuit for display 104 uses the YUV format image data of the current frame that is output by the image processor 103. Specifically, the resizer circuit for display 104 performs a process of compressing (third de-squeeze process) the YUV format image data of the current frame (image data 202) that is output by the image processor 103 in the up and down direction (vertically). The image data that has undergone the third de-squeeze process is stored in the RAM 111 as the image data to be displayed (image data 402). The stored image data to be displayed is output externally (to an external device) via the external output unit 115 (image data 412), with a black frame defining upper, lower, left, and right borders added so that the angle of view is the same as that of the image data to be displayed (image data 401) generated by the second de-squeeze process. Alternatively, the image data to be displayed may be output to the liquid crystal panel 107.

When the de-squeeze process is not to be performed, the resizer circuit for display 104 generates image data to be displayed using the YUV format image data of the current frame (image data 202) that is output by the image processor 103. The generated image data to be displayed (image data 403) is stored in the RAM 111. The stored image data to be displayed is output externally (to an external device) via the external output unit 115 (image data 413). Alternatively, the image data to be displayed may be output to the liquid crystal panel 107.

<Second De-Squeeze Process>

Figure 5A:
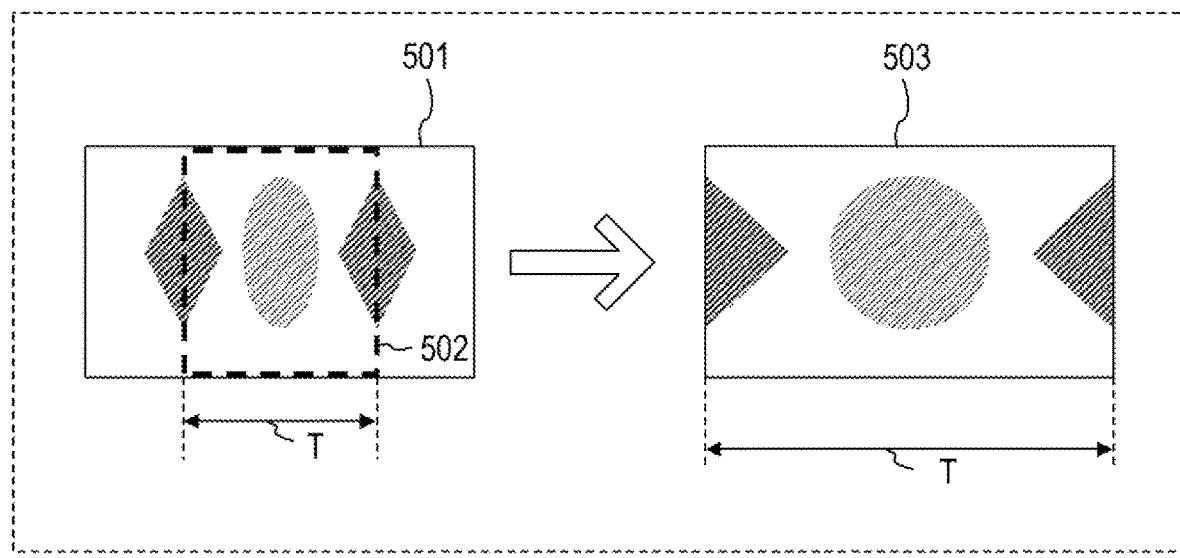
FIG. 5A and FIG. 5B are diagrams illustrating examples of de-squeeze processes according to the embodiment.

FIG. 5A is a diagram illustrating an example of the second de-squeeze process performed by the resizer circuit for display 104. The resizer circuit for display 104 acquires image data for recursive NR (image data 501) of 1 frame before that is acquired from the RAM 111. The resizer circuit for display 104 then cuts out a region to be used for display (region 502) of the image data for recursive NR of 1 frame before and stretches (enlarges) the region horizontally to generate the image data to be displayed (image data 503). Since all the image data for recursive NR of 1 frame before has already been stored in the RAM 111 during the second de-squeeze process, the resizer circuit for display 104 can read out the required part of the image data (region 502) immediately from the RAM 111. Therefore, time T is available for the de-squeeze process, which means the generation of the image data to be displayed can take twice longer than the time required for the first de-squeeze process (time T/2). The second de-squeeze process can also be understood as a process of horizontally enlarging a region of a predetermined aspect ratio of an image of a frame prior to an Nth frame recorded in the memory.

<Third De-Squeeze Process>

Figure 5B:
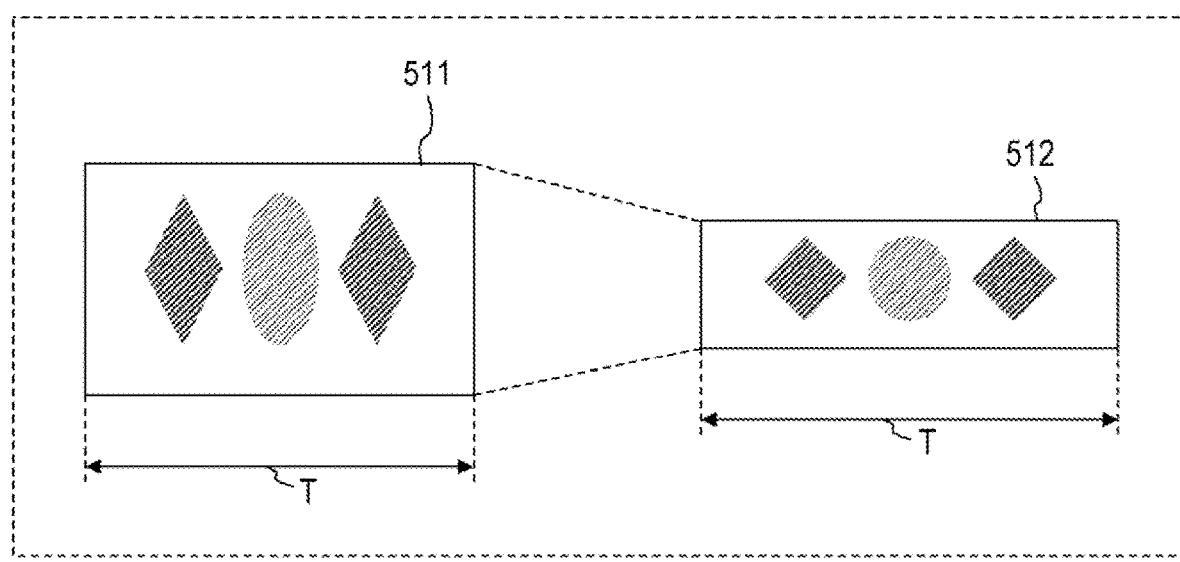

FIG. 5B is a diagram illustrating an example of the third de-squeeze process performed by the resizer circuit for display 104. The resizer circuit for display 104 generates image data to be displayed (image data 512) by vertically compressing the entire region of the YUV format image data (image data 511) output by the image processor 103 by ½. Here the resizer circuit for display 104 can be regarded as generating image data to be displayed by reversing the vertical/horizontal ratio of the image compressed by the lens unit 101 back to 1:1. In the third de-squeeze process, the entire image data 511 is used to generate the image data to be displayed. Therefore, the third de-squeeze process can take twice longer time (time T) for the generation of the image data to be displayed than the time required for the first de-squeeze process (time T/2). The third de-squeeze process can also be understood as a process of vertically shrinking the image of an Nth frame.

<Processing Contents>

Next, an example of display processing according to this embodiment will be described with reference to the flow-chart shown in FIG. 6. The various processing steps of this flowchart are realized by the system controller 108 deploying a program stored in the ROM 110 to the RAM 111 and executing the same. It should be understood here that the imaging apparatus 100 allows for setting of the record frame rate of a moving image to any of 24 [frames per second (fps)], 30 [fps], 60 [fps], 120 [fps], and 240 [fps]. The processing of FIG. 6 should be understood to be feasible during the recording of a moving image at any of 24 [fps], 30 [fps], 60 [fps], 120 [fps], and 240 [fps].

At S601, the system controller 108 acquires YUV format image data of an Nth frame. Specifically, the system controller 108 generates an image signal of the Nth frame by converting the light image formed by the image sensor 102 (image compressed by the lens unit 101 to have a vertical/horizontal compression ratio of 1:2) into an electrical signal. The system controller 108 then controls the image processor 103 to convert the image signal into RAW data (RAW image). After that, the system controller 108 performs RAW development processing such as interpolation, image quality adjustment, etc., to the RAW data, generates (acquires) YUV format image data corresponding to the RAW data, and outputs the same to the resizer circuit for display 104 and image compression circuit 114.

At S602, the system controller 108 controls the resizer circuit for record 105 to perform resizing to the YUV format image data of the Nth frame to generate image data to be recorded, and to store the same in the RAM 111. The image data to be recorded that is stored in the RAM 111 is encoded by the image compression circuit 114, and written in the memory card 113 as moving image data via the memory card controller 112.

At S603, the system controller 108 controls the image processor 103 to store the image data for recursive NR of the Nth frame (image data 207) in the RAM 111 (e.g., DRAM).

At S604, the system controller 108 determines whether or not the de-squeeze setting of the imaging apparatus 100 is ON. The "de-squeeze setting" here is the setting that determines whether the second or third de-squeeze process is to be performed. The de-squeeze setting is set by the user operating the operation switches 109 on the basis of the menu information displayed on the liquid crystal panel 107. If the de-squeeze setting is ON, the process goes to S605, and if not (if the setting is OFF), goes to S610.

At S605, the system controller 108 determines whether or not the display mode of the imaging apparatus 100 is a display mode with minimum delay. The "display mode with minimum delay" is a mode set to perform the third de-squeeze process described above, a mode in which the imaging apparatus 100 is controlled to achieve a minimum period between the image formation of the object on the image sensor 102 and the output thereof to the external device (to minimize delay). The mode is set by the user operating the operation switches 109 on the basis of the menu information displayed on the liquid crystal panel 107. If the setting is the display mode with minimum delay, the process goes to S608, and if not, goes to S606.

At S606, the system controller 108 performs the second de-squeeze process. Specifically, the system controller 108 controls the resizer circuit for display 104 to read out a region of the image data for recursive NR of the (N−1)th frame, and stretches (enlarges) the region horizontally to generate the image data to be displayed. The image data for recursive NR of the (N−1)th frame is the image data of the (N−1)th frame stored in the RAM 111 in the processing step of S603. The enlarging process is as has been described with reference to FIG. 5A. The processing steps of S602 and S603, and of S604 to S610, may be performed in parallel.

At S607, the system controller 108 outputs the image data to be displayed that was generated at S606 to the external device via the external output unit 115.

At S608, the system controller 108 performs the third de-squeeze process. Specifically, the system controller 108 controls the resizer circuit for display 104 to shrink (compress) the image data of the Nth frame output by the image processor 103 vertically to generate the image data to be displayed. For example, image data to be displayed having a vertical/horizontal compression ratio of 1:1 can be obtained by compressing the image data by ½ vertically.

At S609, the system controller 108 controls the resizer circuit for display 104 to add a black frame defining upper, lower, left, and right borders (to perform a side-blacking process) to the image data to be displayed that was generated at S608, and to output the same to the external device. The "side-blacking process" is a process for matching the angle of view to that of the image data to be displayed (image data 401) that has undergone the second de-squeeze process, a process of blacking out the areas outside the region displayed by the second de-squeeze process. It can be understood that the system controller 108 carries out the third de-squeeze process when the display mode is the display mode with minimum delay, and carries out the second de-squeeze process when the display mode is other than the display mode with minimum delay.

At S610, the system controller 108 generates the image data to be displayed and outputs the same to the external device as the image of the Nth frame. Specifically, the system controller 108 controls the resizer circuit for display 104 to perform resizing and so on to the YUV format image data of the Nth frame input from the image processor 103 to generate the image data to be displayed. The system controller 108 then outputs the generated image data to be displayed to the external device as the image of the Nth frame.

At S611, the system controller 108 determines whether or not all the processing of the image data of the Nth frame is complete. For example, the system controller 108 determines whether or not time T, which is the time for the cycle of 1 frame to pass, has passed. If all the processing has been complete, the process goes to S612, and if not, the determination at S611 is repeated.

At S612, the system controller 108 switches the target of this processing flow from the image data of the Nth frame to the image data of the (N+1)th frame. After that, the process goes to S601, and the processing is performed for the image data of the (N+1)th frame.

<Beneficial Effects of this Embodiment>

As described above, the second de-squeeze process enables generation of image data to be displayed in time T that is the input time for 1 line when the time available for the de-squeeze process is short (e.g., when the frame rate is high).

As described above, the third de-squeeze process enables generation of image data to be displayed in time T that is the input time for 1 line by vertically compressing the image that was horizontally compressed by the lens unit (recovering the original vertical/horizontal ratio). The second de-squeeze process entails a delay in display of 1 frame when outputting the image data to an external device or the like (image data output at S607) as compared to the image data that is output without the de-squeeze process (image data output at S610). In contrast, the third de-squeeze process enables de-squeezing without causing a delay in display.

Variation Examples

While one example has been described in the embodiment above wherein image data for recursive NR of the (N−1)th frame is used when the second de-squeeze process is to be performed, the frame to be used is not limited to this example. For example, image data of a frame prior to the (N−2)th frame may be used as the image data for recursive NR.

While one example has been described in the embodiment above wherein either the second de-squeeze process or the third de-squeeze process is performed depending on the mode setting, the second de-squeeze process may be carried out without the mode determination. For example, referring to FIG. 6 described above, if the de-squeeze setting is ON (Yes at S604), the processing steps of S606 and S607 may be performed instead of the processing steps of S605, S608, and S609. Similarly, the third de-squeeze process may be carried out without the mode determination described above. For example, referring to FIG. 6 described above, if the de-squeeze setting is ON (Yes at S604), the processing steps of S608 and S609 may be performed instead of the processing steps of S605 to S607.

While one example has been described in the embodiment above wherein either the second de-squeeze process or the third de-squeeze process is performed instead of the first de-squeeze process, it may be determined which of the first to third de-squeeze processes should be carried out depending on a predetermined condition. For example, when the frame rate is higher than a preset value (e.g., 60 [fps] or 120 [fps]), the second de-squeeze process or the third de-squeeze process may be carried out. When the frame rate is lower than a preset value (e.g., from 24 [fps] to less than 60 [fps]), the first de-squeeze process may be carried out. The de-squeeze process to be carried out when the frame rate is a preset value is not limited to a particular one. The first de-squeeze process may be carried out, for example. While frame rates of 24 fps, 30 fps, 60 fps, 120 fps, and 240 fps are given as examples in the embodiment described above, the frame rates are not limited to these.

The imaging apparatus described above can also be understood as an image processing apparatus including an acquisition unit acquiring a captured image of 1 frame as an Nth frame, and a display controller. The display controller executes control, within a period of acquiring and recording an image of 1 frame, to record the Nth frame image in a moving image file, and to record the Nth frame image in a DRAM (memory). The display controller executes control to horizontally enlarge a horizontal area with a first number of pixels of an image of the (N–1)th frame recorded in the DRAM to a second number of pixels that is larger than the first number of pixels and to display the same.

Various control processes described above that are performed by the system controller 108 may be carried out by one hardware system, or, a plurality of hardware units (e.g., a plurality of processors and circuits) may share the processing and achieve overall control of the apparatus.

While the disclosure has been described in detail based on the exemplary embodiments thereof, the disclosure is not limited to these specific embodiments, and various other modes within the scope of the subject matter of this disclosure shall be included in this disclosure. Further, various features described above merely show one embodiment of the disclosure and these various features may be combined in various manners.

While one example in which the disclosure is applied to an imaging apparatus has been described in the embodiment above, the disclosure is not limited to this example and can be applied to any image processing apparatus that controls the display of images captured by an imager. Namely, the aspect of the embodiments is applicable to personal computers, PDA, mobile phone terminals, portable image viewers, printer devices with a display, digital photo frames, music players, game machines, electronic book readers, and so on. The aspect of the embodiment is also applicable to external recorders or external monitors that are controlled to acquire, display, and record images captured by the imaging apparatus.

The aspect of the embodiments is not limited to an imaging apparatus itself but also applicable to a controller that remotely controls an imaging apparatus (including a network camera) by communicating therewith via wired or wireless communication. Devices that remotely control imaging apparatuses include, for example, smart phones, tablet PCs, desktop PCs, and so on. Imaging apparatuses can be controlled remotely by notifying commands from the controller based on the operations or processing performed on the controller side for causing the imaging apparatuses to perform various operations and settings. It is also possible to receive live view images captured by the imaging apparatus via wired or wireless communication and display the images on the controller side.

The aspect of the embodiments is realized also by executing the following processing, which includes supplying the software (program) that realizes the functions of the embodiment described above to a system or an apparatus via a network or various memory media, and reading out and executing program codes by a computer (or CPU, MPU, etc.) of the system or apparatus. In this case, the program and the memory medium storing this program constitute the aspect of the embodiments.

According to the aspect of the embodiments, de-squeezed images can be generated even when the frame rate is high.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-009115, filed on Jan. 23, 2020, which is hereby incorporated by reference herein in its entirety.

What is claimed is:
1. An apparatus, comprising:
at least one processor and/or at least one circuit to perform operations as:
an acquisition unit configured to acquire a captured image of 1 frame as an Nth frame image; and
a control unit configured to (1) record the Nth frame image in a memory, (2) enlarge a4 region having a predetermined aspect ratio in a horizontal direction wherein the region is a part of an image of a frame prior to the Nth frame image recorded in the memory, and (3)

display the enlarged region, within a period in which the Nth frame image is acquired and recorded,
wherein the control unit is further configured to enlarge in horizontal direction the region having the predetermined aspect ratio in the image of a frame prior to the Nth frame image recorded in the memory and display the enlarged region within the period in which the Nth frame image is acquired and recorded, in a case where a frame rate is a first frame rate, and
wherein the control unit is further configured to enlarge in horizontal direction the region having the predetermined aspect ratio in the Nth frame image instead of the image of a frame prior to the Nth frame image and display the enlarged region within the period in which the Nth frame image is acquired and recorded, in a case where a second frame rate that is different from the first frame rate is set.

2. The apparatus according to claim 1,
wherein the control unit is further configured not to use a region other than the region having the predetermined aspect ratio in the image of a frame prior to the Nth frame image, in processing of enlarging the region having the predetermined aspect ratio in a horizontal direction and displaying the enlarged region.

3. The apparatus according to claim 1,
wherein the control unit is further configured not to enlarge in a vertical direction the region having the predetermined aspect ratio in the image of a frame prior to the Nth frame image, in processing of enlarging the region having the predetermined aspect ratio in a horizontal direction and displaying the enlarged region.

4. The apparatus according to claim 1,
wherein the image of a frame prior to the Nth frame image is an image of an (N−1)th frame.

5. The apparatus according to claim 1, wherein the memory is a dynamic random access memory (DRAM).

6. The apparatus according to claim 1, wherein the control unit is further configured to (1) record the Nth frame image in the memory and (2) record the Nth frame image in a moving image file, within the period in which the Nth frame image is acquired and recorded.

7. The apparatus according to claim 1,
wherein the period of acquiring the Nth frame image is a period of acquiring an image of 1 frame that is the Nth frame image.

8. The apparatus according to claim 1,
wherein the control unit is further configured to:
within the period in which the Nth frame image is acquired and recorded,
(1) shrink the region in a vertical direction the Nth frame image and display the shrunk region instead of enlarging in the horizontal direction the region having the predetermined aspect ratio in the image of a frame prior to the Nth frame image, in a case where a display mode is set to a first mode in which delay occurring from image capturing until image display is suppressed, and
(2) enlarge in the horizontal direction the region having the predetermined aspect ratio in the image of a frame prior to the Nth frame image and display the enlarged region, in a case where the display mode is set to a second mode that is different from the first mode in which the delay is suppressed.

9. The apparatus according to claim 8, wherein the control unit is further configured to black out a region other than the region having the predetermined aspect ratio in a shrunk image, in a case where the display mode is the first mode.

10. The apparatus according to claim 1, wherein the acquired image is an image that is captured using an anamorphic lens and that is not de-squeezed.

11. The apparatus according to claim 1, wherein the first frame rate is any of 60 fps, 120 fps, and 240 fps.

12. The apparatus according to claim 1, wherein the second frame rate is either one of 24 fps and 30 fps.

13. A control method of an apparatus, comprising:
acquiring a captured image of 1 frame as an Nth frame image;
(1) recording the Nth frame image in a memory, (2) enlarging a region having a predetermined aspect ratio in a horizontal direction wherein the region is a part of an image of a frame prior to the Nth frame image recorded in the memory, and (3) displaying the enlarged region, within a period in which the Nth frame image is acquired and recorded;
in a case where a frame rate is a first frame rate, enlarging in horizontal direction the region having the predetermined aspect ratio in the image of a frame prior to the Nth frame image recorded in the memory and displaying the enlarged region within the period in which the Nth frame image is acquired and recorded; and
in a case where a second frame rate that is different from the first frame rate is set, enlarging in horizontal direction the region having the predetermined aspect ratio in the Nth frame image instead of the image of a frame prior to the Nth frame image and displaying the enlarged region within the period in which the Nth frame image is acquired and recorded.

14. The method according to claim 13, further comprising:
recording the Nth frame image in the memory; and
recording the Nth frame image in a moving image file, within the period in which the Nth frame image is acquired and recorded.

15. A non-transitory computer-readable storage medium storing a program for causing a computer to execute:
acquiring a captured image of 1 frame as an Nth frame image;
(1) recording the Nth frame image in a memory, (2) enlarging a region having a predetermined aspect ratio in a horizontal direction wherein the region is a part of an image of a frame prior to the Nth frame image recorded in the memory, and (3) displaying the enlarged region, within a period in which the Nth frame image is acquired and recorded;
in a case where a frame rate is a first frame rate, enlarging in horizontal direction the region having the predetermined aspect ratio in the image of a frame prior to the Nth frame image recorded in the memory and displaying the enlarged region within the period in which the Nth frame image is acquired and recorded; and
in a case where a second frame rate that is different from the first frame rate is set, enlarging in horizontal direction the region having the predetermined aspect ratio in the Nth frame image instead of the image of a frame prior to the Nth frame image and displaying the enlarged region within the period in which the Nth frame image is acquired and recorded.

16. The non-transitory computer-readable storage medium according to claim 15, further comprising:
recording the Nth frame image in the memory; and
recording the Nth frame image in a moving image file, within the period in which the Nth frame image is acquired and recorded.

17. An apparatus, comprising:
at least one processor and/or at least one circuit to perform operations as:
an acquisition unit configured to acquire a captured image of 1 frame as an Nth frame image; and
a control unit configured to (1) record the Nth frame image in a memory, (2) enlarge a region having a predetermined aspect ratio in a horizontal direction wherein the region is a part of an image of a frame prior to the Nth frame image recorded in the memory, and (3) display the enlarged region, within a period in which the Nth frame image is acquired and recorded,
wherein the control unit is further configured to: within the period in which the Nth frame image is acquired and recorded,
(1) shrink the region in a vertical direction the Nth frame image and display the shrunk region instead of enlarging in the horizontal direction the region having the predetermined aspect ratio in the image of a frame prior to the Nth frame image, in a case where a display mode is set to a first mode in which delay occurring from image capturing until image display is suppressed, and
(2) enlarge in the horizontal direction the region having the predetermined aspect ratio in the image of a frame prior to the Nth frame image and display the enlarged region, in a case where the display mode is set to a second mode that is different from the first mode in which the delay is suppressed.

* * * * *